US010410354B1

United States Patent
Feng et al.

(10) Patent No.: US 10,410,354 B1
(45) Date of Patent: Sep. 10, 2019

(54) METHOD AND APPARATUS FOR MULTI-MODEL PRIMITIVE FITTING BASED ON DEEP GEOMETRIC BOUNDARY AND INSTANCE AWARE SEGMENTATION

(71) Applicant: Mitsubishi Electric Research Laboratories, Inc., Cambridge, MA (US)

(72) Inventors: Chen Feng, Cambridge, MA (US); Duanshun Li, Edmonton (CA)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/912,738

(22) Filed: Mar. 6, 2018

(51) Int. Cl.
*G06N 3/08* (2006.01)
*G06F 3/0484* (2013.01)
(Continued)

(52) U.S. Cl.
CPC ............ *G06T 7/143* (2017.01); *G06N 5/046* (2013.01); *G06T 7/60* (2013.01); *G06K 9/00456* (2013.01);
(Continued)

(58) Field of Classification Search
CPC . G06T 7/143; G06T 7/60; G06T 2207/20084; G06N 5/046
(Continued)

(56) References Cited

U.S. PATENT DOCUMENTS 4,320,451 A * 3/1982 Bachman .................. G06F 9/52
718/106
8,004,517 B1 * 8/2011 Edelsbrunner .......... G06T 17/20
345/419
(Continued)

FOREIGN PATENT DOCUMENTS

| WO | 2017100903 | 12/2016 |
|----|------------|---------|
| WO | 2017190743 | 4/2017  |
| WO | 2017220966 | 6/2017  |

OTHER PUBLICATIONS

Myers et al. "Affordance Detection of tool parts from geometric features," 2015 IEEE International Conference on Robotics and Automation, ICRA, IEEE, May 26, 2015, pp. 1374-1381.
(Continued)

*Primary Examiner* — Ly D Pham
(74) *Attorney, Agent, or Firm* — Gennadiy Vinokur; James Mcaleenan; Hironori Tsukamoto

(57) ABSTRACT

An image processing system includes an interface to transmit and receive data via a network, a processor connected to the interface, a memory storing an image processing program modules executable by the processor, wherein the image processing program causes the processor to perform operations. The operations include providing a point cloud of an image including objects into a segmentation network, segmenting point-wisely the point cloud into multiple classes of the objects and detecting boundaries of the objects using the segmentation network, wherein the segmentation network outputs a probability of associating primitive
(Continued)

classes of the objects based on the segmented multiple classes and the segmented boundaries, verifying and refining the segmented multiple classes and the segmented boundaries using a predetermined fitting method, and correcting misclassification of the multiple classes of the objects by fitting the primitives to the multiple classes.

12 Claims, 9 Drawing Sheets

(51) Int. Cl.
| | | |
|---|---|---|
| G06K 9/62 | (2006.01) | |
| G06K 9/66 | (2006.01) | |
| G06T 7/143 | (2017.01) | |
| G06N 5/04 | (2006.01) | |
| G06T 7/60 | (2017.01) | |
| G06T 7/246 | (2017.01) | |
| G06K 9/00 | (2006.01) | |

(52) U.S. Cl.
CPC ............ *G06K 9/6267* (2013.01); *G06N 3/08* (2013.01); *G06T 7/246* (2017.01); *G06T 2207/20084* (2013.01)

(58) Field of Classification Search
USPC .......................................................... 706/20
See application file for complete search history.

(56) References Cited

U.S. PATENT DOCUMENTS

| | | | | |
|---|---|---|---|---|
| 8,700,620 | B1* | 4/2014 | Lieberman | G06F 17/30731 707/728 |
| 2009/0009513 | A1* | 1/2009 | van den Hengel | G06T 17/20 345/420 |
| 2011/0304628 | A1* | 12/2011 | Fu | G06K 9/00201 345/441 |
| 2015/0317821 | A1* | 11/2015 | Ding | G06T 7/00 345/420 |
| 2017/0076438 | A1 | 3/2017 | Kottenstette et al. | |
| 2018/0107940 | A1* | 4/2018 | Lieberman | G06N 5/022 |
| 2018/0174311 | A1* | 6/2018 | Kluckner | G06K 9/3233 |
| 2018/0232583 | A1* | 8/2018 | Wang | G06K 9/00812 |

OTHER PUBLICATIONS

Holz et al., "Fast Range Image Segmentation and Smoothing using Approximate Surface Reconstruction and Region Growing," 7th International Conference on Knowledge Management in Organizations Service and Cloud cComputing, Jun. 26, 2012, pp. 1-6.
Boulch et al., "Unstructured Point Cloud Semantic Labeling using Deep Segmentation Networks," Eurographics Workshop on 3D Object Retrieval, Jan. 1, 2017.
Laube et al., "Evaluation of Features for SVM-based Classification of Geometric Primitives in Point Clouds," Conference Paper, May 2017, DOI: 10.23919/MVA.2017.7986776, Conference: Conference: Machine Vision Applications (MVA), 2017 15th IAPR International Conference on, vol. 15.

* cited by examiner

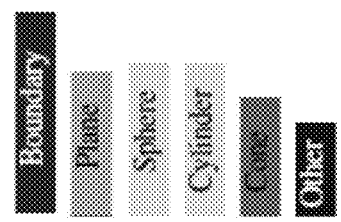
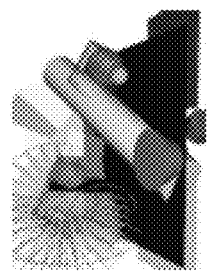
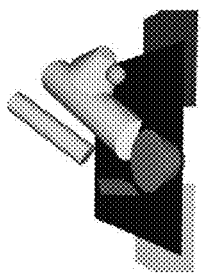
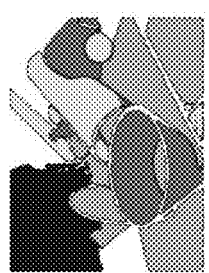
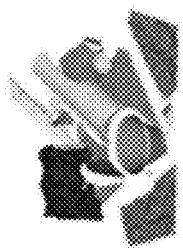

|  | Precision ||||||| Recall |||||||
|---|---|---|---|---|---|---|---|---|---|---|---|---|---|
|  | BND | PLN | SPH | CYL | CON | AVE | BND | PLN | SPH | CYL | CON | AVE |
| N+BO | 0.944 |  |  |  |  |  | 0.820 |  |  |  |  |  |
| P | | 0.915 | 0.811 | 0.867 | 0.642 | 0.809 | | 0.971 | 0.630 | 0.715 | 0.664 | 0.745 |
| N | | 0.979 | 0.915 | 0.934 | 0.727 | 0.869 | | 0.968 | 0.804 | 0.708 | 0.829 | 0.872 |
| PN | | 0.978 | 0.913 | 0.910 | 0.710 | 0.860 | | 0.984 | 0.830 | 0.808 | 0.797 | 0.864 |
| P+MB | | 0.929 | 0.818 | 0.888 | 0.639 | 0.822 | | 0.967 | 0.659 | 0.790 | 0.700 | 0.783 |
| N+MB | | 0.978 | 0.899 | 0.923 | 0.737 | 0.884 | | 0.985 | 0.864 | 0.806 | 0.816 | 0.868 |
| PN+MB | | 0.979 | 0.911 | 0.908 | 0.677 | 0.867 | | 0.949 | 0.860 | 0.792 | 0.805 | 0.852 |
| N+BIAS | | 0.963 | 0.908 | 0.926 | 0.756 | 0.886 | 0.849 | 0.976 | 0.874 | 0.803 | 0.821 | 0.871 |
| N+MB+BIAS | | 0.980 | 0.886 | 0.891 | 0.677 | 0.851 | 0.808 | 0.977 | 0.855 | 0.765 | 0.749 | 0.831 |
| NS | | 0.977 | 0.917 | 0.909 | 0.744 | 0.890 |  | 0.979 | 0.877 | 0.909 | 0.806 | 0.890 |
| NS+MB | | 0.976 | 0.911 | 0.929 | 0.725 | 0.884 |  | 0.977 | 0.860 | 0.884 | 0.793 | 0.859 |
| NS+BIAS | 0.847 | 0.966 | 0.906 | 0.912 | 0.728 | 0.880 | 0.804 | 0.970 | 0.873 | 0.808 | 0.812 | 0.853 |

| RANSAC | No. Primitives Fitted ($N_P$) | | | | No. Matched Instance ($N_{(2p)}$) | | | | $N/\lambda/$ $N/\lambda/_{all}$ |
|---|---|---|---|---|---|---|---|---|---|
| | PLN | SPH | CYL | CON | ALL | PLN | SPH | CYL | CON | ALL | |
| P | 4596 | 1001 | 2358 | 3123 | 11078 | 2017 | 549 | 942 | 879 | 4380 | 0.395 |
| N | 5360 | 621 | 2341 | 2937 | 10260 | 2448 | 591 | 1219 | 944 | 5202 | 0.507 |
| PN | 4617 | 961 | 2780 | 2492 | 10859 | 2565 | 870 | 1456 | 1254 | 6145 | 0.566 |
| P+MB | 4537 | 888 | 3172 | 2133 | 10730 | 2522 | 859 | 1498 | 1197 | 6076 | 0.566 |
| N+MB | 5103 | 654 | 2201 | 2061 | 10019 | 2573 | 625 | 1249 | 1010 | 5257 | 0.525 |
| PN+MB | 4479 | 931 | 2732 | 2654 | 10796 | 2528 | 857 | 1442 | 1222 | 6049 | 0.560 |
| N+BIAS | 4236 | 951 | 3169 | 2505 | 10861 | 2427 | 856 | 1455 | 1168 | 5906 | 0.554 |
| N+MB+BIAS | 3893 | 845 | 2299 | 2108 | 9145 | 2279 | 796 | 1453 | 1149 | 5677 | 0.621 |
| NS | 3815 | 800 | 2399 | 1947 | 9161 | 2240 | 773 | 1356 | 1002 | 5382 | 0.587 |
| NS+MB | 3701 | 863 | 1874 | 1876 | 8314 | 2400 | 859 | 1458 | 1256 | 6033 | 0.726 |
| NS+MB+BIAS | 3717 | 858 | 1920 | 1930 | 8425 | 2400 | 857 | 1479 | 1199 | 6025 | 0.715 |
| NS+BIAS | 3500 | 804 | 1765 | 1730 | 7799 | 2254 | 834 | 1397 | 1129 | 5584 | 0.716 |

METHOD AND APPARATUS FOR MULTI-MODEL PRIMITIVE FITTING BASED ON DEEP GEOMETRIC BOUNDARY AND INSTANCE AWARE SEGMENTATION

FIELD OF THE INVENTION

The present invention is generally related to an apparatus and method for multi-model primitive fitting, and more specifically to multi-model primitive fitting using deep geometric boundary and instance aware segmentation.

BACKGROUND OF THE INVENTION

The technical field of the related art is in reverse engineering by recognizing and fitting multi-model multi-instance geometric primitives (e.g., planes, cylinders, spheres, cones, etc.). The most classic solution to this problem is RANSAC-based method, which in practice often lead to inferior fitting results, due to a combination of multiple factors including noisy points (and therefore noisy normal estimation) and cluttered scene formed by multiple class and/or multiple instance of geometric primitives, which are well-known to impede RANSAC-based method's robustness. Other methods base on Hough Transform or global energy minimization, suffers similarly from the above challenges.

SUMMARY OF THE INVENTION

To identify and fit geometric primitives (e.g., planes, spheres, cylinders, cones) in a noisy point cloud is a challenging yet beneficial task for fields such as robotics and reverse engineering. As a multi-model multi-instance fitting problem, it has been tackled with different approaches including RANSAC, which however often fit inferior models in practice with noisy inputs of cluttered scenes. Inspired by the corresponding human recognition process, and benefiting from the recent advancements in image semantic segmentation using deep neural networks, some embodiments of the present invention disclose BIASFit as a new framework addressing this problem. Firstly, through a fully convolutional neural network, the input point cloud is point-wisely segmented into multiple classes divided by jointly detected instance boundaries without any geometric fitting. Thus, segments can serve as primitive hypotheses with a probability estimation of associating primitive classes. Finally, all hypotheses are sent through a geometric verification to correct any misclassification by fitting primitives respectively. Some embodiments disclose training using simulated range images and tested it with both simulated and real world point clouds. Further, some embodiments of the present invention provide quantitative and qualitative experiments demonstrated the superiority of BIASFit.

Further, some embodiments of the present invention make it possible to use a convolutional neural network (CNN) for recognizing and fitting multi-model multi-instance geometric primitives (e.g., planes, cylinders, spheres, cones, etc.). Some embodiments of the present invention perform geometric segmentation of the input point cloud into multiple primitive classes, separated by simultaneously detected geometric instance boundaries. Each segment serves as a primitive hypothesis with a probability estimation of its associated primitive class. All the hypotheses are sent through a geometric verification to correct any misclassification by fitting primitives respectively.

According to some embodiments of the present invention, an image processing system includes an interface to transmit and receive data via a network; a processor connected to the interface; a memory storing an image processing program modules executable by the processor, wherein the image processing program causes the processor to perform operations include providing a point cloud as a range image of objects into a segmentation network; segmenting point-wisely the point cloud into multiple classes of the objects and simultaneously detecting boundaries of the objects using the segmentation network, wherein the segmentation network outputs a probability of associating primitive classes of the objects based on the segmented multiple classes and the segmented boundaries; verifying and refining the segmented multiple classes and the segmented boundaries using a predetermined fitting method; and correcting misclassification of the multiple classes of the objects by fitting the primitives to the multiple classes.

Further, according to embodiments, a non-transitory computer readable medium storing programs including instructions executable by one more processors, wherein the instructions cause the one or more processors, in connection with a memory, to perform the instructions including: providing a point cloud of an image including objects into a segmentation network; segmenting point-wisely the point cloud into multiple classes of the objects and detecting boundaries of the objects using the segmentation network, wherein the segmentation network outputs a probability of associating primitive classes of the objects based on the segmented multiple classes and the segmented boundaries; verifying and refining the segmented multiple classes and the segmented boundaries using a predetermined fitting method; and correcting misclassification of the multiple classes of the objects by fitting the primitives to the multiple classes.

Yet, further, according to embodiments of the present invention, an image processing method for performing multi-model primitive fitting, includes providing a point cloud of an image including objects into a segmentation network; segmenting point-wisely the point cloud into multiple classes of the objects and detecting boundaries of the objects using the segmentation network, wherein the segmentation network outputs a probability of associating primitive classes of the objects based on the segmented multiple classes and the segmented boundaries; verifying and refining the segmented multiple classes and the segmented boundaries using a predetermined fitting method; and correcting misclassification of the multiple classes of the objects by fitting the primitives to the multiple classes.

BRIEF DESCRIPTION OF THE DRAWINGS

FIG. 2A is an example illustrating a primitive fitting of a simulated test range image, according to embodiments of the present invention;

FIG. 2B is an example illustrating a primitive fitting of a simulated test range image using RANSAC, according to embodiments of the present invention;

FIG. 2C is an example illustrating estimated normals, according to embodiments of the present invention;

FIG. 2D is an example illustrating a primitive fitting of a simulated test range image using BIASFit, according to embodiments of the present invention;

FIG. 2E is an example illustrating ground truth labels, according to embodiments of the present invention;

FIG. 2F is an example illustrating an instance-aware segmentation (a boundary-aware segmentation), according to embodiments of the present invention;

FIG. 2G shows examples representing primitives used in FIG. 2E and FIG. 2F, according to embodiments of the present invention;

FIG. 5A and FIG. 5B show an example of geometric segmentation evaluation, according to embodiments of the present invention;

FIG. 7A and FIG. 7B show a summary of evaluation results of the primitive fitting using a simulated test set.

Figure 1:
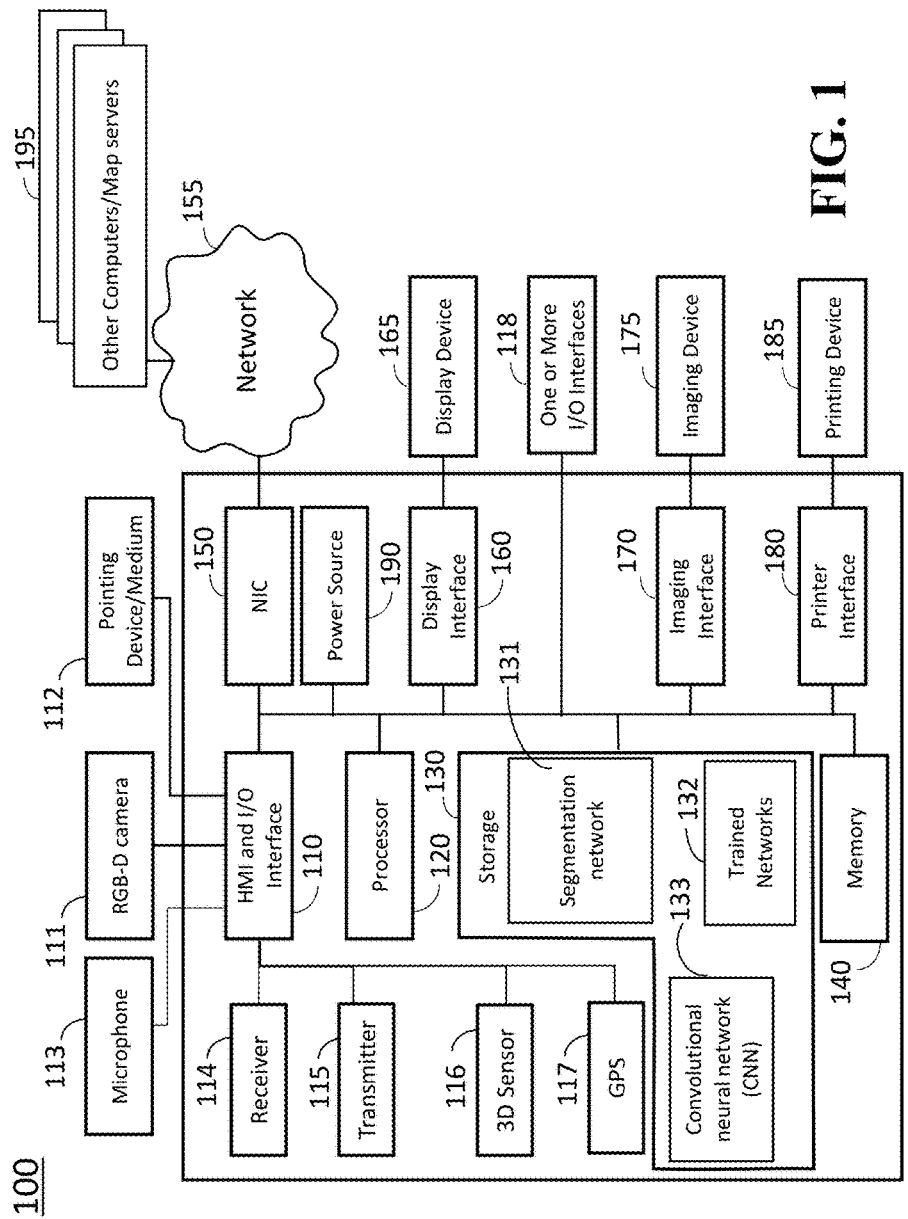
FIG. 1 is a block diagram of a multi-model primitive fitting system, according to embodiments of the present invention.

We use the same visualization style for the CNN, where each block means layers sharing a same spatial resolution, decreasing block height means decimating spatial resolution by a half, and red dashed lines means loss computation. The black dashed line is only applied for joint boundary detection with multi-binomial loss where low-level edge features are expected to be helpful if skip-concatenated for the final boundary classification. The resulting segmentation probability maps Yk (FIG. 3B, darker for higher probability) for each primitive class k are sent through a geometric verification to correct any misclassification by fitting the corresponding class of primitives (bottom row of FIG. 3A). Finally, fitted primitives are shown in FIG. 3C. Without loss of generality, this disclosure only focuses on four common primitives: plane, sphere, cylinder, and cone.

DETAILED DESCRIPTION OF THE PREFERRED EMBODIMENTS

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

Embodiments of the present disclosure can provide a methodology to easily obtain point-wise ground truth labels from simulated dataset for supervised geometric segmentation, demonstrate its ability to generalize to real-world dataset and will release the simulated dataset for benchmarking. Further, the embodiments also present a novel framework for multi-model primitive fitting, which performs both qualitatively and quantitatively superior than RANSAC-based methods on noisy range images of cluttered scenes. Some embodiments introduce this geometric segmentation task for CNN with several design analyses and comparisons.

The idea of decomposing a scene or a complex object into a set of simple geometric primitives for visual object recognition dates back as early as 1980s when Biederman proposed the object Recognition-By-Components theory, in which primitives were termed "geons". Although some real scenes can be more complicated than simple combinations of "geons", there are many useful ones that can be efficiently modeled for the purpose of robotics: planes in man-made structures, utility pipelines as cylinders, household objects such as paper cups, and more interestingly, a robot itself, often as an assembly of simple primitives. Thus, for better extro- and intro-spection to improve the intelligence of all kinds of robots, from autonomous cars to service robots, it is beneficial to robustly detect those primitives and accurately estimate the associated parameters from noisy 3D sensor inputs, such as robotic manipulation that requires poses and shapes of objects, SLAM that takes advantage of primitives (mostly planes) for better mapping accuracy, reverse engineering that models complex mechanical parts as primitives, and similarly as-built Building Information Modeling.

This primitive fitting technique includes challenges: with given primitive parameters, point-to-primitive (P2P) membership can be determined by nearest P2P distance; and vice versa by robust estimation. The challenge comes when multiple factors present together: a noisy point cloud (thus noisy normal estimation), a cluttered scene due to multiple instances of a same or multiple primitive models, and also background points not explained by the primitive library.

FIG. 1 is a block diagram illustrating a multi-model primitive fitting system 100 for performing multi-model primitive fitting of objects in images using deep geometric boundary and instance aware segmentation, according to embodiments of the present disclosure.

The primitive fitting system 100 can include a human machine interface (HMI) with input/output (I/O) interface 110 connectable with at least one RGB-D camera 111 (depth camera) and a pointing device/medium 112, a microphone 113, a receiver 114, a transmitter 115, a 3D sensor 116, a global positioning system (GPS) 117, one or more I/O interfaces 118, a processor 120, a storage device 130, a memory 140, a network interface controller 150 (NIC) connectable with other computers and Map servers via a network 155 including local area networks and internet network (not shown), a display interface 160 connected to a display device 165, an imaging interface 170 connectable with an imaging device 175, a printer interface 180 connectable with a printing device 185. The HMI with I/O interface 110 may include analog/digital and digital/analog converters. The HMI with I/O interface 110 may include a wireless communication interface that can communicate with other object detection and localization systems, other computers or map servers via wireless internet connections or wireless local area networks. The HMI with I/O interface 110 may include a wire communication interface that can communicate with the other computers and the map servers via the network 155. The primitive fitting system 100 can include a power source 190. The power source 190 may be a battery rechargeable from an external power source (not shown) via the I/O interface 118. Depending upon the application the power source 190 may be optionally located outside of the primitive fitting system 100, and some parts may be pre-integrated in a single part.

The HMI and I/O interface 110 and the I/O interfaces 118 can be adapted to connect to another display device (not shown) including a computer monitor, camera, television, projector, or mobile device, among others.

The primitive fitting system 100 can receive electric text/images, a point cloud including three dimensional (3D) points assigned for the multi-model primitive fitting, and documents including speech data using a receiver 114 or the NIC 150 via the network 155. In some cases, an average 3D point with respect to a subset of 3D points is assigned for multi-model primitive fitting. The storage device 130 includes a segmentation network 131, trained networks (program module) 132 and a convolutional neural network (CNN) (program modules) 133, in which the program modules of the networks 131, 132 and 133 can be stored into the storage 130 as program codes. Multi-model primitive fitting can be performed by executing the instructions of the programs stored in the storage 130 using the processor 120. Further, the program modules of the networks 131, 132 and 133 may be stored to a computer readable recording medium (not shown) so that the processor 120 can perform multi-model primitive fitting for 3D points according to the algorithms by loading the program modules from the medium. Further, the pointing device/medium 112 may include modules that read programs stored on a computer readable recording medium.

In order to start acquiring a point cloud data using the sensor 116, instructions may be transmitted to the primitive fitting system 100 using a keyboard (not shown) or a start command displayed on a graphical user interface (GUI) (not shown), the pointing device/medium 112 or via the wireless network or the network 190 connected to other computers 195 enabling crowdsourcing for multi-model primitive fitting 3D point clouds. The acquiring of the point cloud may be started in response to receiving an acoustic signal of a user by the microphone 113 using pre-installed conventional speech recognition program stored in the storage 130.

The processor 120 may be a plurality of processors including one or more graphics processing units (GPUs). The storage 130 may include speech recognition algorithms (not shown) that can recognize speech signals obtained via the microphone 113.

Further, the primitive fitting system 100 may be simplified according to the requirements of system designs. For instance, the primitive fitting system 100 may be designed by including the at least one RGB-D camera 111, the interface 110, the processor 120 in associating with the memory 140 and the storage 130 storing the segmentation network 131 and trained networks 132 and convolutional neural network (CNN) 133, and other combinations of the parts indicated in the figure. The trained networks 132 may include convolutional networks indicated by P/N/PN (position/normal/position and normal), P/N/PN+MB (multi-binominal), N+BIAS, N+MB+BIAS, N5, N5+MB, N5+BIAS, and N+BO.

FIG. 2A shows an example illustrating a primitive fitting of a simulated test range image, according to embodiments of the present invention. FIG. 2B is an example illustrating a primitive fitting of a simulated test range image using RANSAC. FIG. 2C is an example illustrating estimated normal. FIG. 2D shows an example illustrating a primitive fitting of a simulated test range image using BIASFit.

FIG. 2E is an example illustrating ground truth labels. FIG. 2F is an example illustrating an instance-aware segmentation (a boundary-aware segmentation). Further, FIG. 2G shows examples representing primitives used in FIG. 2E and FIG. 2F, according to embodiments of the present invention.

In this case, the estimated normals (FIG. 2C) and the ground truth labels (FIG. 2E) are used to train a fully convolutional segmentation network in BIASFit. During testing, a boundary-aware and thus instance-aware segmentation (FIG. 2F) is predicted, and sent through a geometric verification to fit final primitives (randomly colored). Comparing with BIASFit, the RANSAC-based method produces more misses and false detections of primitives (shown as transparent or wireframe), and thus a less appealing visual result.

Framework

FIGS. 3A, 3B, 3C and 3D illustrate a visual overview of the multi-model primitive fitting process by the BIASFit framework according to embodiments of the present invention.

Figure 3A:
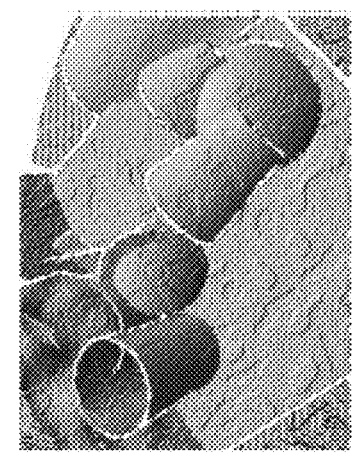
FIG. 3A is an example illustrating a proper form of a range image, according to embodiments of the present invention.
Figure 3B:
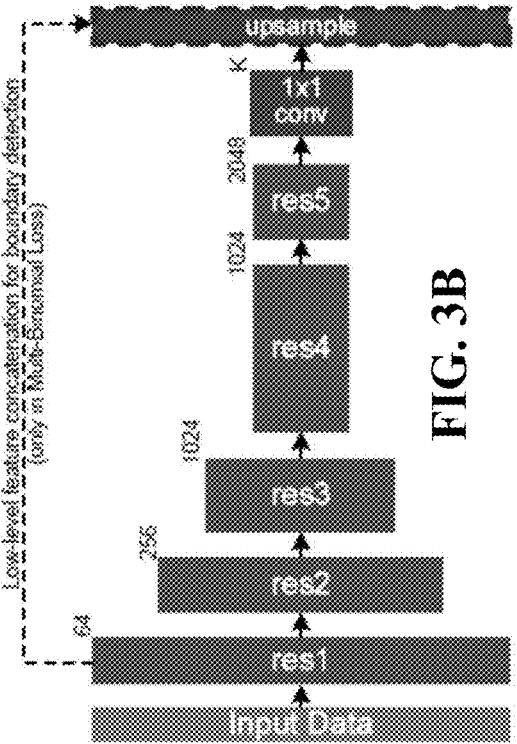
FIG. 3B shows a fully convolutional neural network (CNN) for segmentation, according to embodiments of the present invention.
Figure 3C:
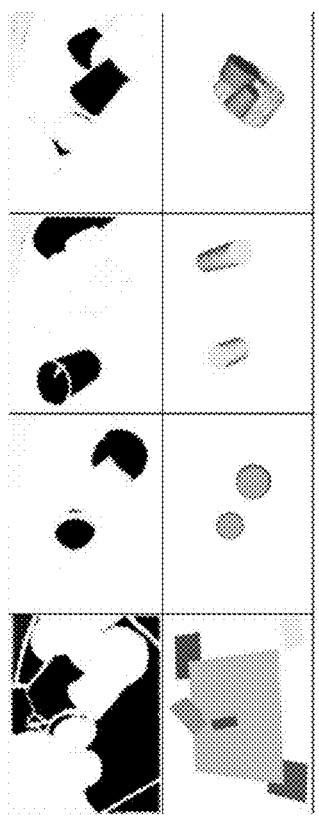
FIG. 3C shows a geometric verification illustrating segmentation probability maps, according to embodiments of the present invention.

FIGS. 3A-3D show a front-end of this framework that mimics the human visual perception process in that it does not explicitly use any geometric fitting error or loss in a CNN. FIG. 3B shows a fully convolutional neural network (CNN) for segmentation, according to embodiments of the present invention. In FIG. 3B, a proper form of a range image, e.g., its normal map, is input to a fully convolutional neural network for segmentation. The same visualization style is used for the CNN, where each block means layers sharing a same spatial resolution, decreasing block height means decimating spatial resolution by a half, and red dashed lines means loss computation. The black dashed line is only applied for joint boundary detection with multi-binomial loss where low-level edge features are expected to be helpful if skip-concatenated for the final boundary classification. The resulting segmentation probability maps Yk (top row of FIG. 3C, darker for higher probability) for each primitive class k are sent through a geometric verification to correct any misclassification by fitting the corresponding class of primitives (bottom row of FIG. 3C).

Figure 3D:
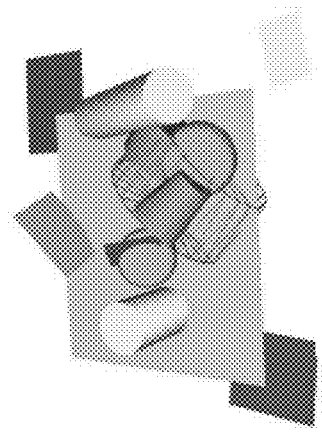
FIG. 3D shows an example illustrating fitted primitives, according to embodiments of the present invention.

Finally, fitted primitives are shown in FIG. 3D. Without loss of generality, the present disclosure only focuses on four common primitives: plane, sphere, cylinder, and cone.

Instead, it takes advantage of a set of stable features learned by CNN that can robustly discriminate points belonging to different primitive classes. The meaning of a pixel of the output probability map (top row of FIG. 3C) can be interpreted as how much that point and its neighborhood look like a specific primitive class, where the neighborhood size is the CNN receptive field size. Such a segmentation map could already be useful for more complex tasks, yet for the sake of a robust primitive fitting pipeline, one cannot fully trust this segmentation map as it inevitably contains misclassification, just like all other image semantic segmentations. This calls for a geometric verification step to incorporate our strong prior knowledge, i.e., the mathematical definitions of those primitive classes, to correct any potential classification errors. One could make an analogy between this and the CRF post-processing step in image semantic segmentation that usually improves segmentation performance, while the advantage for this geometric segmentation task is that exact spatial constraints can be easily applied to correct CNN segmentation results, if given a good initial segmentation.

Ground Truth from Simulation

Before going to the details of our segmentation CNN, we need to first address the challenge of preparing training data, because as most state-of-the-art image semantic segmentation methods, our CNN needs to be trained by supervision.

To our best knowledge, we are the first to introduce such a geometric primitive segmentation task for CNN, thus there is no existing publicly available datasets for this task. For image semantic segmentation, there have been many efforts to use simulation for ground truth generation. Yet it is hard to make CNNs trained over simulated data generalize to real world images, due to intrinsic difficulties of tuning a large number of variables affecting the similarities between simulated images and real world ones.

However, since we are only dealing with geometric data, and that 3D observation is less sensitive to environmental variations, plus observation noise models of most 3D sensors are well studied, we hypothesize that simulated 3D scans highly resemble real world ones such that CNNs trained on simulated scans can generalize well to real world data. If this is true, then for this geometric task, we can get infinite number of point-wise ground truth almost for free.

Although saved from tedious manual labeling, we still need a systematic way of generating both random scene layouts of primitives and scan poses so that simulated scans are meaningful and covers true data variation as much as possible. Due to the popular Kinect-like scanners, which mostly applied in indoor environment, we choose to focus on simulating indoor scenes. And note that this does not limit our BIASFit framework to only indoor situations. Given a specific type of scenes and scanners, one should be able to adjust the random scene generation protocols similarly. Moreover, we hypothesize that the CNN is less sensitive to the overall scene layout. What's more important is to show the CNN enough cases of different primitives occluding and intersecting with each other.

Thus, we choose to randomly generate a room-like scene with 10 meters extent at each horizontal direction. An elevated horizontal plane representing a table top is generated at a random position near the center of the room. Other primitives are placed near the table top to increase the complexity. Furthermore, empirically, the orientation of cylinder/cone axis or plane normal is dominated by horizontal or vertical directions in real world. Thus several primitive instances at such orientations are generated deliberately in addition to fully random ones. For planes, two additional disk shaped planes are added to make the dataset more general. To make the training set more realistic, two NURBS surfaces (class name "Other" in FIG. 2G) are added, representing objects not explained by our primitive library in reality. An existing scanner simulator, Blensor, was used to simulate VGA-sized Kinect-like scans, where class and instance IDs can be easily obtained during the virtual scanning process by ray-tracing. The default Kinect scanner was adopted except that the noise sigma parameter was set to 0.005. Note that we do not carefully tune the parameters to match the simulated noise with real Kinect noise model.

In fact, our simulated scanner produces slightly noisier points than and a real Kinect sensor. To generate random scan poses, the virtual scanners were firstly placed around the center of the "table". Then camera viewing directions were sampled on a grid of longitudinal $\pi/6$ and latitudinal $\pi/12$ intervals ranging from $[-\pi, \pi)$ and $[-\pi/6, \pi/2)$, resulting in 81 directions in total. For each direction, two distances to the table's center ranging between $[1.5, 4]$m were uniformly sampled.

Figure 4:
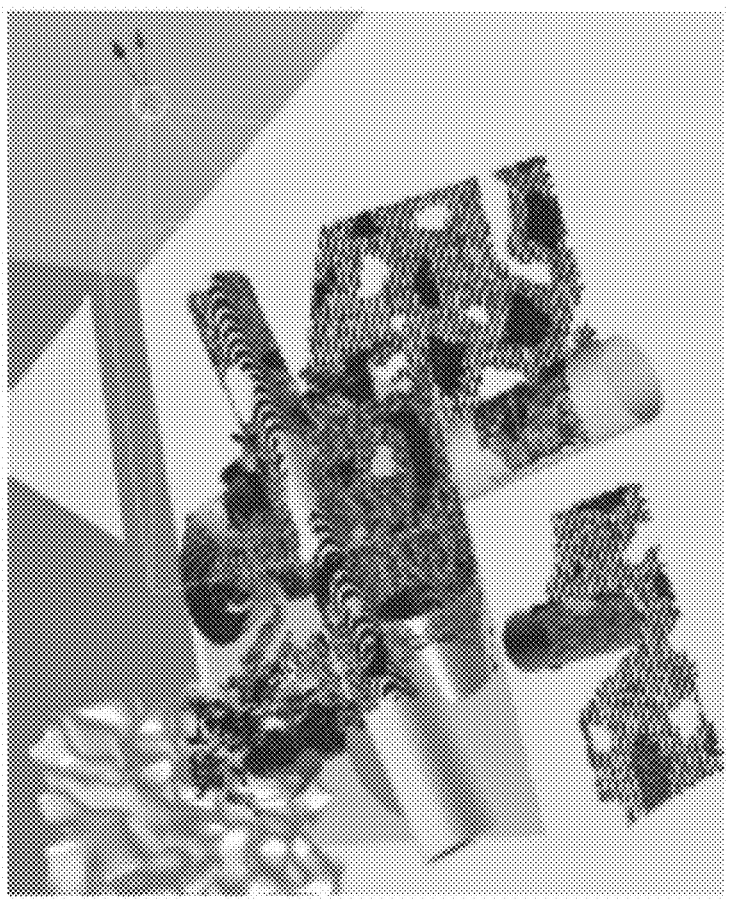
FIG. 4 is an example illustrating a simulated Kinect scan of a random scene, according to embodiments of the present invention.

Thus, for each scene we obtain a total number of 192 scan poses. At last, a uniform noise between $[-\pi/24, \pi/24]$ was added to each viewing direction both horizontally and vertically. FIG. 4 is an example illustrating a simulated Kinect scan of a random scene, according to embodiments of the present invention. In the figure, black dots represent the scanned points. Further, FIG. 4 shows the screenshot of such a scan. Totally 20 scenes were generated following this protocol. 18 scenes, i.e. 3456 scans, were split for training, and the other 2 scenes, i.e. 384 scans, were used for validation. The test set is generated through a similar protocol, containing 20 scenes (each with 36 scans). Note that invalid points were converted to the zero-depth point avoiding computation issues.

Boundary and Instance Aware Segmentation

Our segmentation network (FIG. 3A) follows the same basic network, which is based on the 101-layer ResNet with minor modifications to improve segmentation performance. While the semantic segmentation CNN architecture is actively being developed, there are several design choices to be considered to achieve the best performance on a given base network for our new task. Position vs. Normal Input. The first design choice is about the input representation. Since we are dealing with 3D geometric data, what form of input should be supplied to the CNN? A naive choice is to directly use point positions as a 3-channel tensor input. After all, this is the raw data we get in reality, and if the CNN is powerful enough, it should be able to learn everything from this input form. However, it is unclear how or whether necessary to normalized it.

A second choice is to use estimated per-point unit normal as the input. This is also reasonable, because we can almost perceive the correct segmentation by just looking as the normal maps as shown in FIG. 3A. Plus it is already normalized, which usually enables better CNN training. However, since normals are estimated from noisy neighboring points, one might have concerns about loss of information compared with the previous choice. And a third choice is to combine the first two, resulting in a 6-channel input, through which one might hope the CNN to benefit from merits of both.

Multinomial vs. Multi-Binomial Loss

The second design question is: what kind of loss function to use? While many semantic segmentation CNN choose the multinomial cross entropy loss through a softmax function, recent studies have found other loss functions such as the self-balancing multibinomial loss to perform better for certain tasks, with weights accounting for imbalanced classes. In this study, we consider two types of loss functions: 1) the classic "softmax loss", and 2) a multi-binomial loss with class-specific loss weights $\beta_k$ as hyper-parameters:

$$\mathcal{L}(W) = \sum_k \beta_k \mathcal{L}_k(W) \quad (1)$$

$$= \sum_k \beta_k \sum_p \{-\bar{Y}_k(p) \log Y_k(p \mid I; W) -$$

$$(1 - \bar{Y}_k(p)) \log(1 - Y_k(p \mid I; W))\},$$

where W are the learnable parameters, p a pixel index, $\bar{Y}_k$ the ground truth binary image and $Y_k$ the network predicted probability map of the k-th primitive class ($k \in [1, K]$), and I the input data. We set k to be proportional to 1 over the total number of k-th class points in the training set.

Separate vs. Joint Boundary Detection

When multiple instances of a same primitive class occlude or intersect with each other, even an ideal primitive class segmentation cannot divide them into individual segments, leaving a multi instance fitting problem still undesirable for the geometric verification step to solve, which discounts the original purpose of this geometric segmentation. Moreover, boundaries usually contain higher noises in terms of estimated normals, which could negatively affect primitive fittings that use normals (e.g., 2-point based cylinder fitting). One way to alleviate the issue is to cut such clusters into primitive instances by instance-aware boundaries. In fact, with such a step, we move from category- to Boundary- and Instance-Aware Segmentation, thus term our method as BIASFit. To realize this, we also have two choices, 1) training a separate network only for instance boundary detection, or 2) treating boundary as an additional class to be segmented jointly with primitive classes. One can expect the former to have better boundary detection results as the network focuses to learn boundary features only, although as a less elegant solution with more parameters and longer running time. Thus it is reasonable to trade the performance a bit for the latter one.

Handling of Background Class

When generating random scenes, we added NURBS modeling background points not explained by the four primitive classes, for a more realistic and challenging dataset. Thus we need to properly handle them in the CNN. Should we ignore background class when computing the loss, or add it as an additional class?

For all of the above design questions, we will rely on experiments to empirically select the best performing ones.

Verification by Fitting

Given the predicted probability maps $\{Y_k\}$, we need to generate and verify primitive hypotheses and fit primitive parameters of the correct ones to complete our mission. One direct way of hypothesis generation is to simply binaries the BIAS output $\{Y_k\}$ by thresholding to produce a set of connected components, and fit only one k-th class primitive for a component coining from $Y_k$.

However, when the CNN incorrectly classify certain critical regions due to non-optimal thresholds, two instances can be connected, thus leading to suboptimal fittings or miss detection of some instances. Moreover, a perfect BIAS output may bring another issue that an instance gets cut into several smaller pieces due to occlusions (e.g., the top left cylinder in FIG. 2A). And fitting in smaller regions of noisy scans usually result in false instance rejection or lower estimation accuracy. since the core contribution of this disclosure is to propose and study the feasibility of BIASFit as a new strategy towards this problem, we left it as our future work to develop more systematic ways to better utilize $\{Y_k\}$ for primitive fitting.

In this work, we simply follow a classic "arg max" prediction on $\{Y_k\}$ over each point, and get K groups of hypothesis points associated to each of the K primitive classes. Then we solve K times of multi-instance primitive fitting using the RANSAC-based method. This is more formally described in Algorithm 1. Note this does not completely defeat the purpose of BIAS. The original RANSAC-based method feed the whole point cloud into the pipeline and detect primitives sequentially in a greedy manner. Because it tends to detect larger objects first, smaller primitives close to large ones could often be missed, as their member points might be incorrectly counted as inlier of larger objects, especially if the inlier threshold is improperly set. BIAS can alleviate such effects and especially removing boundary points from RANSAC sampling is expected to improve its performance.

---

Algorithm 1 Primitive Fitting from argmax Hypotheses function PRIMITIVEFITTING(I, $\{Y_k\}$)
    $M_k \leftarrow \emptyset, \forall k \in [1, K]$    ▷ initialize hypotheses sets
    for $p \in I$ do    ▷ assign a pixel to its best set
        $j = \text{argmax}_k\{Y_k(p)\}$
        $M_j \leftarrow M_j \cup \{p\}$
    Prims $\leftarrow \emptyset$
    for $k \in [1, K]$ do    ▷ detect primitives from each set
        Prims $\leftarrow$ Prims$\cup$EfficientRANSAC($M_k$, I)
    return Prims

---

Primitive Fitting Evaluation

It is non-trivial to design a proper set of evaluation criteria for primitive detection and fitting accuracy, and we are not aware of any existing work or dataset that does so. It is difficult to comprehensively evaluate and thus compare different primitive fitting methods partly because 1) as mentioned previously, due to occlusion, a single instance is commonly fitted into multiple primitives, both of which may be close enough to the ground truth instance; and 2) such over detection might also be caused by improper inlier thresholds on a noisy data.

Pixel-wise average precision (AP) and AP of instances matched at various levels (50~90%) of point-wise intersection-over-union (IoU) are used for evaluating image based instance segmentation problems. However, this typical IoU range is inappropriate for our problem. More than 50% IoU means at most one fitted primitive can be matched for each true instance. Since we don't need more than 50% of true points to fit a reasonable primitive representing the true one, this range is over-strict and might falsely reject many good fits: either more than 50% true points are taken by other incorrect fits, or during observation the true instance is occluded and split into pieces each containing less than 50% true points. After all, a large IoU is not necessary for good primitive fitting.

Thus, the IoU is replaced by intersection-over-true (IoT) in this problem. It indicates the number of true inliers of a predicted primitive over the total number of points in the true instance. Thus, a predicted primitive and a true instance is matched if 1) IoT>30% and 2) the predicted primitive having the same class as the true instance. This indicates that one instance can have at most 3 matched predictions. Based on the above matching criteria, a matched instance (if exists) can be identified for each predicted primitive.

On the contrary, each true instance may have several best matching prediction candidates. To eliminate the ambiguity, the candidate that has the smallest fit error is selected as the best match. To be fair and consistent, fitting error is defined as the mean distance to a primitive by projecting all of the points in the true instance onto the predicted primitive. After the matches are found, primitive average precision (PAP) and primitive average recall (PAR) are used to quantify the primitive detection quality.

$$\text{PAP}=N_{p2t}/N_p, \text{PAR}=N_{t2p}/N_t, \qquad (2)$$

where Np2t is the number of predictions having a matched true instance, Np the total number of predicted primitives, Nt2p the number of true instance with a best prediction, and Nt the total number of true instances, all counted over the whole test set.

Geometric Segmentation Experiments

Network Short Names. To explore answers to the design questions raised in section IV, we designed several CNNs and their details with short names are listed as follows:

P/N/PN. Basic networks, using position (P), normal (N), or both (PN) as input, trained with a multinomial loss function, outputting a 4-channel mutual-exclusive class probability maps (i.e., each pixel's probabilities sum up to one, K=4). Background class points, the NURBS, are ignored for loss computation.

P/N/PN+MB. Same as the above basic networks except trained using the multi-binomial (MB) loss function as in equation (1), outputting a 4-channel non-mutual exclusive class probability maps (i.e., each pixel's probabilities not necessarily sum up to one, thus being multibinomial classifiers, K=4).

N+BIAS. Network trained with normal input and BIAS labels (i.e., instance-aware boundary as an additional class jointly trained, K=5).

N+MB+BIAS. Same as N+BIAS except trained using a multi-binomial manner (K=5).

N5. Same as basic network N except treating the background class as an additional class involved in loss computation (K=5).

N5+MB. Same as N5 except trained using a multibinomial manner (K=5).

N5+BIAS. Same as N+BIAS except trained using a multi-binomial manner (i.e., boundary and NURBS are two additional classes jointly trained, K=6).

N+BO. Same as N except only trained to detect boundary (i.e., a binary classifier, K=2).

Example of Implementations.

We implemented the geometric segmentation CNNs using Caffe and DeepLabv2. Normals were estimated by PCA using a 55 window. We use meters as the unit for networks requiring position input. Instance-aware boundaries were calculated if not all pixels belong to a same instance (or contain invalid points) in a 5×5 window. Input data size was randomly cropped into 440×440 during training time, while full VGA resolution was used during test time. All of our networks were trained with the following hyper-parameters tuned on the validation set: 50 training epochs (i.e. 17280 iterations), batch size 10, learning rate 0.1 linearly decreasing to zero until the end of training, momentum 0.9, weight decay 5e-4. The networks were trained and evaluated using several NVIDIA TITAN X GPUs each with 12 GB memory, with a 2.5 FPS testing frame rate.

Figure 5B:
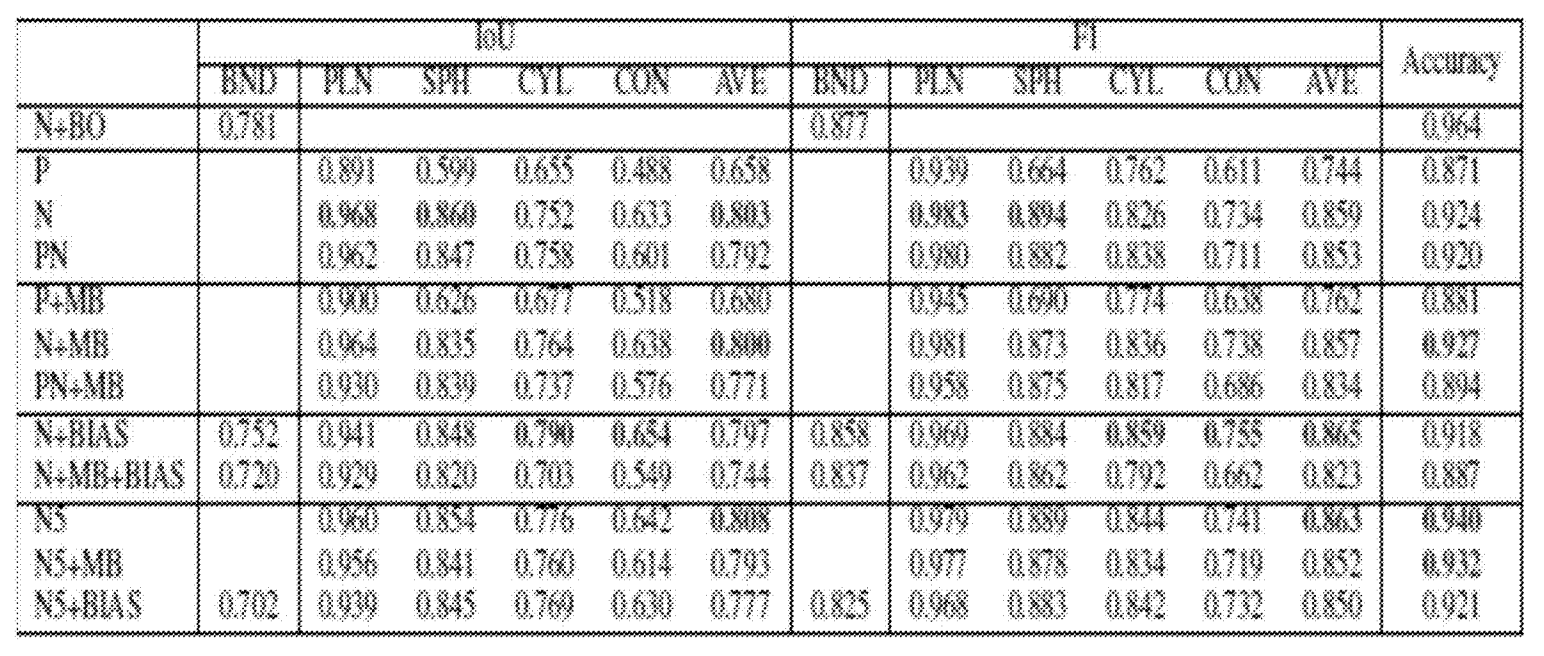

FIGS. 5A and 5B show a summary of evaluation results of all 12 networks on the test set of 720 simulated scans. The summary indicates the following.

1) Comparing the P/N/PN rows, we found that normal input turned out to be the best, and interestingly outperforming combination of both normal and position.

This may be caused by the difficulty in normalizing position data for network input.

2) Comparing the P/N/PN+MB rows, we found that the classic multinomial loss leads to better performance mostly than the multi-binomial loss.

3) Comparing the N with N+BIAS, we found that adding additional boundary detection to the segmentation only have very small negative influences to the segmentation performance. This is appealing since we used a single network to perform both segmentation and boundary detection. Further comparing the N+BIAS with N+BO, we found that BIAS in fact increases the boundary recall comparing to N+BO that only detects boundaries.

4) Comparing the N5 with N, we found that the effect of ignoring background class is inconclusive in terms of significant performance changes, which however suggests the benefit of jointly training the background class, as this enables the following steps to focus only on regions seemingly explainable by the predefined primitive library.

Just for reference, we tried SVM using neighboring 7×7 or 37×37 normals or principal curvatures for this task, and the highest pixel-wise accuracy we obtained after many parameter tuning is only 66%.

Generalizing to Real Data.

Figure 6A:
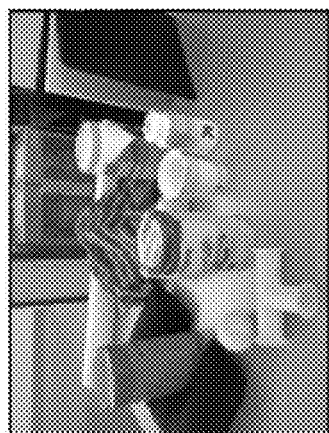
FIG. 6A is an example of an image of a scanned scene, according to embodiments of the present invention.
Figure 6B:
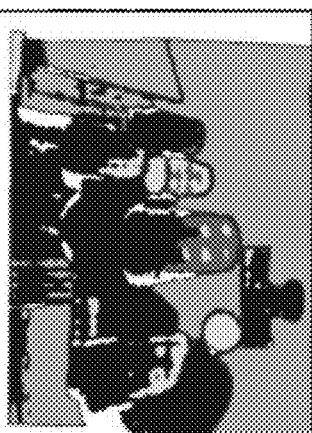
FIG. 6B is an example of segmentation results, according to embodiments of the present invention.
Figure 6C:
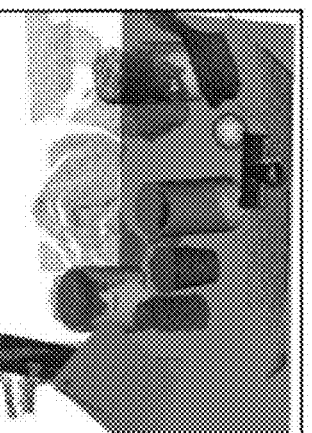
FIG. 6C is an example illustrating fitted primitives, according to embodiments of the present invention.

FIG. 6A is an example of an image of a scanned scene, according to embodiments of the present invention. FIG. 6B is an example of segmentation results, and FIG. 6C is an example illustrating fitted primitives, according to embodiments of the present invention. Even though we did not tune the simulated scanner's noise model to match our real Kinect scanner, the network trained with simulated scans generalizes quite well to real world data as shown in the figures.

Primitive Fitting Experiments

Figure 7B:
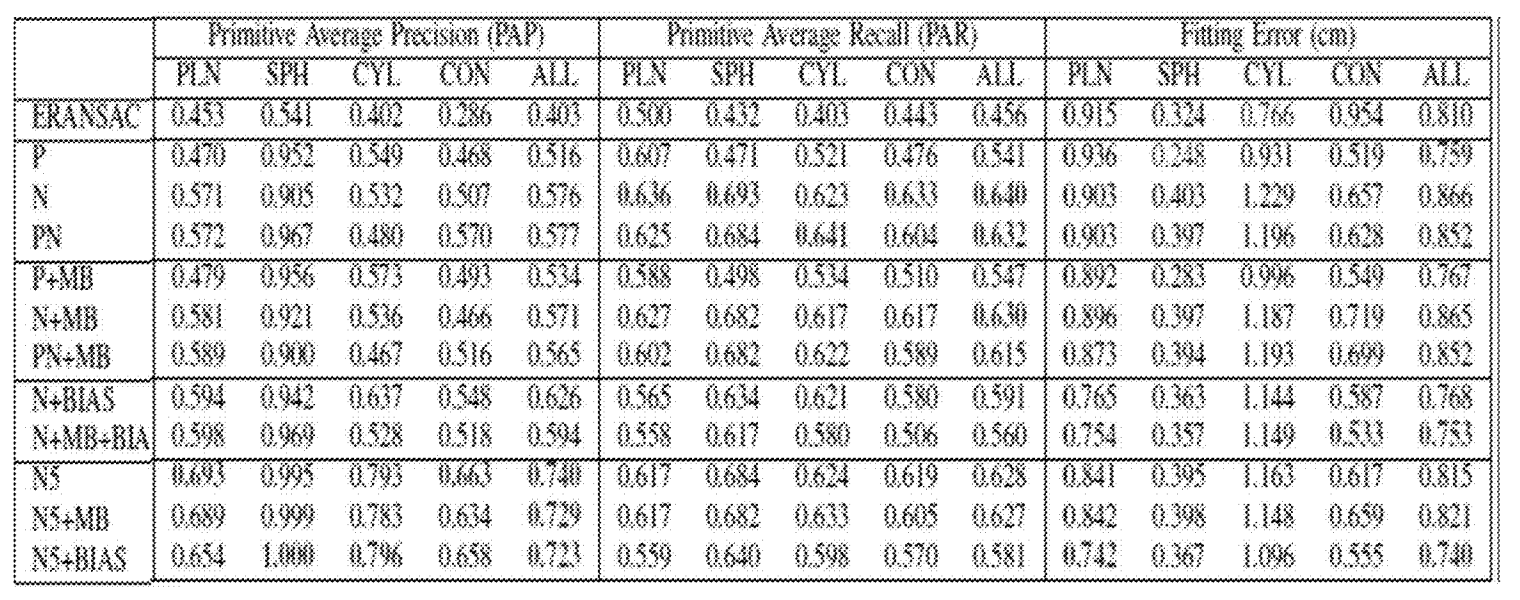

For fitting primitives, we used the original efficient RANSAC implementation both as our baseline method (short name ERANSAC) and for our geometric verification. Experiment Details. We used the following parameters for all primitive fitting experiments, tuned on the validation set in effort of maximizing ERANSAC performance: min number of supporting points per primitive 1000, max inlier distance 0.03 m, max inlier angle deviation 30 degrees (for counting consensus scores) and 45 degrees (for final inlier set expansion), overlooking probability 1e-4. The simulated test set contains 4033 planes, 1256 spheres, 2338 cylinders, 1982 cones, and in total 9609 primitive instances. Using respective network's segmentation as input to Algorithm 1, the primitive fitting results were evaluated on the simulated test set. FIG. 7A and FIG. 7B show a summary of evaluation results of the primitive fitting together with the ERANSAC baseline. The summary indicates the following.

1) ERANSAC performance is significantly lower than most variants of BIASFit, in accordance with our qualitative evaluation.

2) N5 related experiments receives highest PAP scores, which is reasonable due to the recognition and removal of background classes that greatly reduce the complexity of scenes.

3) In terms of average fitting error, N+BIAS<N, N5+BIAS<N5, N+MB+BIAS<N+MB, which strongly supports the benefit of BIAS as mentioned in section V-A.

4) N5+BIAS gets the lowest fitting error, benefiting from both background and boundary removal before fitting.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. An image processing system, comprising:
   an interface configured to receive image data via a camera or a network;
   a processor connected to the interface for acquiring the image data;
   a memory storing an image processing program modules executable by the processor, wherein the image processing program causes the processor to perform operations including:
   providing a point cloud as a range image of objects into a segmentation network;
   segmenting point-wisely the point cloud into multiple classes of the objects and simultaneously detecting boundaries of the objects using the segmentation network, wherein the segmentation network outputs a probability of associating primitive classes of the objects based on the segmented multiple classes and the segmented boundaries;
   performing a geometric verification step for verifying and refining the segmented multiple classes and the segmented boundaries using a predetermined fitting method; and
   correcting misclassification of the multiple classes of the objects by fitting the primitives to the multiple classes,
   wherein the segmentation network performs both the segmenting and detecting boundaries, and
   wherein the segmentation network outputs the classes of the objects and the boundaries of the objects.

2. The system of claim 1, wherein the image is a surface normal map computed from the range image representing the objects.

3. The system of claim 2, wherein the verifying includes both splitting the image into predetermined groups corresponding to model classes and fitting primitives from hypothesis generated by random sampling.

4. The system of claim 1, wherein the segmentation network is a convolutional neural network (CNN) trained by use of the primitive classes, wherein the primitive classes include a boundary class so as to segment the boundaries of the objects.

5. A non-transitory computer readable medium storing programs including instructions executable by one more processors, wherein the instructions cause the one or more processors, in connection with a memory, to perform the instructions comprising:
   providing a point cloud as a range image of objects into a segmentation network;
   segmenting point-wisely the point cloud into multiple classes of the objects and simultaneously detecting boundaries of the objects using the segmentation network, wherein the segmentation network outputs a probability of associating primitive classes of the objects based on the segmented multiple classes and the segmented boundaries;
   performing a geometric verification step for verifying and refining the segmented multiple classes and the segmented boundaries using a predetermined fitting method; and
   correcting misclassification of the multiple classes of the objects by fitting the primitives to the multiple classes,
   wherein the segmentation network performs both the segmenting and detecting boundaries, and
   wherein the segmentation network outputs the classes of the objects and the boundaries of the objects.

6. The non-transitory computer readable medium of claim 5, wherein the image is a surface normal map computed from the range image representing the objects.

7. The non-transitory computer readable medium of claim 6, wherein the verifying includes both splitting the image into predetermined groups corresponding to model classes and fitting primitives from hypotheses generated by random sampling.

8. The non-transitory computer readable medium of claim 5, wherein the segmentation network is a convolutional neural network (CNN) trained by use of the primitive classes, wherein the primitive classes include a boundary class so as to segment the boundaries of the objects.

9. An image processing method for performing multi-model primitive fitting, comprising:
   providing a point cloud as a range image of objects into a segmentation network;
   segmenting point-wisely the point cloud into multiple classes of the objects and simultaneously detecting boundaries of the objects using the segmentation network, wherein the segmentation network outputs a probability of associating primitive classes of the objects based on the segmented multiple classes and the segmented boundaries;
   performing a geometric verification step for refining-the segmented multiple classes and the segmented boundaries using a predetermined fitting method; and
   correcting misclassification of the multiple classes of the objects by fitting the primitives to the multiple classes,
   wherein the segmentation network performs both the segmenting and detecting boundaries, and
   wherein the segmentation network outputs the classes of the objects and the boundaries of the objects.

10. The method of claim 9, wherein the image is a surface normal map computed from the range image representing the objects.

11. The method of claim 10, wherein the verifying includes both splitting the image into predetermined groups corresponding to model classes and fitting primitives from hypotheses generated by random sampling.

12. The method of claim 9, wherein the segmentation network is a convolutional neural network (CNN) trained by use of the primitive classes, wherein the primitive classes include a boundary class so as to segment the boundaries of the objects.

* * * * *